(12) United States Patent
Zhong (10) Patent No.: US 8,902,547 B1
(45) Date of Patent: Dec. 2, 2014

(54) MULTIPLE LAYERED HEAD INTERCONNECT STRUCTURE

(71) Applicant: Seagate Technology LLC, Cupertino, CA (US)

(72) Inventor: Lijuan Zhong, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/936,788

(22) Filed: Jul. 8, 2013

(51) Int. Cl.
*G11B 5/60* (2006.01)
*G11B 5/48* (2006.01)
*G11B 5/84* (2006.01)

(52) U.S. Cl.
CPC ............. *G11B 5/4853* (2013.01); *G11B 5/84* (2013.01)
USPC ........................................................ 360/234.5

(58) Field of Classification Search
USPC .................................. 360/234.5, 234.4, 245.9
See application file for complete search history.

(56) References Cited

U.S. PATENT DOCUMENTS

| | | | | |
|---|---|---|---|---|
| 4,761,699 A | * | 8/1988 | Ainslie et al. ............... | 360/234.5 |
| 4,789,914 A | * | 12/1988 | Ainslie et al. ............... | 360/234.5 |
| 4,990,724 A | | 2/1991 | Suppelsa et al. | |
| 5,384,432 A | * | 1/1995 | Noro et al. ............... | 174/117 FF |
| 5,408,052 A | | 4/1995 | Inaba et al. | |
| 5,519,552 A | | 5/1996 | Kohira et al. | |
| 5,687,479 A | | 11/1997 | Bennin et al. | |
| 5,737,152 A | | 4/1998 | Balakrishnan | |
| 5,739,982 A | | 4/1998 | Arya et al. | |
| 5,768,062 A | * | 6/1998 | Anderson et al. .......... | 360/245.9 |
| 5,774,975 A | * | 7/1998 | Maffitt et al. ............... | 29/603.12 |
| 5,808,834 A | * | 9/1998 | Jurgenson .................. | 360/234.5 |
| 5,812,344 A | * | 9/1998 | Balakrishnan ............. | 360/245.9 |
| 5,850,320 A | * | 12/1998 | Warmka et al. ............ | 360/245.2 |
| 5,862,010 A | * | 1/1999 | Simmons et al. .......... | 360/99.15 |

(Continued)

FOREIGN PATENT DOCUMENTS

WO 98/20485 5/1998
WO 2011100021 A2 8/2011

OTHER PUBLICATIONS

International Search Report and Written Opinion for PCT Application No. PCT/US2013/038187, dated Jul. 24, 2013, 20 pages.

(Continued)

*Primary Examiner* — Brian Miller
(74) *Attorney, Agent, or Firm* — Westman, Champlin & Koehler, P.A.

(57) ABSTRACT

A multiple layered interconnect structure to provide an electrical interface between one or more electrical elements on a head to read/write circuitry is disclosed. The interconnect structure includes first and second interconnecting layers. The first interconnecting layer is formed on a slider body of the head and includes a first or lower bond pad connectable to one or more electrical elements on the slider body through the first interconnecting layer. The second interconnecting layer includes a second or upper bond pad connectable to the one or more transducer elements through the second interconnecting layer. The second interconnecting layer is on top of the first interconnecting layer and the structure includes an insulating layer between the first and second interconnecting layers. In illustrated embodiments, the first and second interconnecting layers are formed on a back side or surface of the slider body to form top side upper and lower bond pads that interface with bond pads on a flex circuit to provide the interface to R/W circuitry.

17 Claims, 10 Drawing Sheets

(56) References Cited

U.S. PATENT DOCUMENTS

| | | | |
|---|---|---|---|
| 5,889,636 A | 3/1999 | Arya et al. | |
| 5,896,247 A | 4/1999 | Pan et al. | |
| 5,896,248 A * | 4/1999 | Hanrahan et al. | 360/234.5 |
| 5,956,209 A | 9/1999 | Shum | |
| 5,969,906 A | 10/1999 | Arya et al. | |
| 5,986,853 A | 11/1999 | Simmons et al. | |
| 5,995,328 A | 11/1999 | Balakrishnan | |
| 6,125,015 A | 9/2000 | Carlson et al. | |
| 6,134,075 A | 10/2000 | Bennin et al. | |
| 6,351,353 B1 * | 2/2002 | Sluzewski et al. | 360/294.3 |
| 6,587,310 B1 | 7/2003 | Bennin et al. | |
| 6,714,384 B2 | 3/2004 | Himes et al. | |
| 6,717,277 B2 | 4/2004 | Chung et al. | |
| 6,925,702 B2 * | 8/2005 | Krounbi et al. | 29/603.14 |
| 6,965,499 B1 | 11/2005 | Zhang et al. | |
| 6,975,488 B1 * | 12/2005 | Kulangara et al. | 360/246 |
| 6,985,332 B1 * | 1/2006 | Sluzewski et al. | 360/234.5 |
| 7,348,494 B1 | 3/2008 | Handforth et al. | |
| 7,384,531 B1 | 6/2008 | Peltoma et al. | |
| 7,571,540 B2 | 8/2009 | Aonuma et al. | |
| 7,710,688 B1 | 5/2010 | Hentges et al. | |
| 7,875,804 B1 | 1/2011 | Tronnes et al. | |
| 7,929,248 B2 * | 4/2011 | Zhu et al. | 360/234.5 |
| 8,094,413 B1 * | 1/2012 | Hentges et al. | 360/245.9 |
| 8,144,429 B2 * | 3/2012 | Kato | 360/234.5 |
| 8,254,212 B2 | 8/2012 | Snyder et al. | |
| 8,259,540 B1 | 9/2012 | Sahoo et al. | |
| 8,279,558 B2 * | 10/2012 | Limmer et al. | 360/234.5 |
| 8,295,011 B2 | 10/2012 | Chou et al. | |
| 8,351,158 B2 | 1/2013 | Zhu et al. | |
| 8,411,391 B2 | 4/2013 | Hirata et al. | |
| 8,411,535 B1 * | 4/2013 | Hirano et al. | 369/13.32 |
| 8,427,783 B2 * | 4/2013 | Tsuchiya et al. | 360/234.5 |
| 8,488,279 B1 * | 7/2013 | Pan et al. | 360/245.9 |
| 8,705,210 B2 * | 4/2014 | Arai | 360/245.9 |
| 2005/0095878 A1 | 5/2005 | Palanisamy | |
| 2006/0114610 A1 * | 6/2006 | Krause et al. | 360/234.5 |
| 2007/0115590 A1 | 5/2007 | Resh et al. | |
| 2007/0297094 A1 | 12/2007 | Sassine | |
| 2008/0002298 A1 | 1/2008 | Sluzewski | |
| 2008/0094753 A1 * | 4/2008 | Brodkin et al. | 360/234.5 |
| 2008/0170326 A1 * | 7/2008 | Feng et al. | 360/99.04 |
| 2009/0195930 A1 * | 8/2009 | Lille | 360/234.5 |
| 2010/0007980 A1 | 1/2010 | Kim et al. | |
| 2010/0195251 A1 | 8/2010 | Nojima et al. | |
| 2012/0008470 A1 | 1/2012 | Shimazawa et al. | |
| 2012/0044790 A1 | 2/2012 | Shimazawa et al. | |
| 2012/0045662 A1 | 2/2012 | Zou et al. | |
| 2012/0050917 A1 | 3/2012 | Limmer et al. | |

OTHER PUBLICATIONS

International Search Report and Written Opinion for PCT Application No. PCT/US2013/038189, dated Aug. 19, 2013, 10 pages.

Peter Macleod: "A Review of Flexible Circuit Technology and Its Applications", PRIME Faraday Partnership, 2002, XP002710090, Retrieved from the Internet: URL:http://www.lboro.ac.uk/microsites/mechman/research/ipm-ktn/pdf/Technology_review/flexible-circuit-technology-and-its-applications.pdf. ;60 pages.

* cited by examiner

MULTIPLE LAYERED HEAD INTERCONNECT STRUCTURE

BACKGROUND

Data storage devices store data on a data storage media. Illustrative data storage devices include a head having one or more transducer elements to read and/or write data to the data storage media. An interconnect structure or assembly electrically connects the one or more transducer elements on the head to read/write or head circuitry of the device. In illustrated embodiments, the interconnect assembly includes a flex circuit having a plurality of flex traces that connect to the one or more transducer elements through an interconnect structure on the head. Embodiments of the present application relate to an interconnect structure which offers advantages over prior interconnect structures.

SUMMARY

The present application relates to an electrical interconnect between one or more transducer elements on a head to circuitry of a data storage device for read and/or write operations. In illustrated embodiments, the interconnect includes a multiple layered interconnect structure having a first interconnecting layer and a second interconnecting layer on top of the first interconnecting layer. The first interconnecting layer is formed on the slider body and includes a first or lower bond pad connectable to the one or more transducer elements through a conductive trace. The second interconnecting layer includes a second or upper bond pad connectable to the one or more transducer elements through a second upper conductive trace. The structure includes an insulating layer on top of the first interconnecting layer between the first and second interconnecting layers. In illustrated embodiments, the first and second interconnecting layers of the interconnect structure are formed on a back side or surface of the slider body to form top side upper and lower bond pads.

In illustrated embodiments, the first and second interconnecting layers include conductive pads and strips to form the upper and lower bond pads and conductive traces connecting the upper and lower bond pads to the one or more transducer elements. In illustrated embodiments, the insulating layer between the first and second interconnecting layers includes an insulating pad and strip between upper and lower conductive pads and strips of the first and second interconnecting layers. In illustrated embodiments, a protective cover layer is disposed on top of the first and second interconnecting layers to protect the traces from damage and/or corrosion.

Other features and benefits that characterize embodiments of the present invention will be apparent upon reading the following detailed description and review of the associated drawings.

BRIEF DESCRIPTION OF THE DRAWINGS

It should be understood that the above Figures are for illustrative purposes and elements in the drawings are not necessarily drawn to scale. Some elements in the drawings are exaggerated for clarity.

DETAILED DESCRIPTION OF ILLUSTRATIVE EMBODIMENTS

Figure 1:
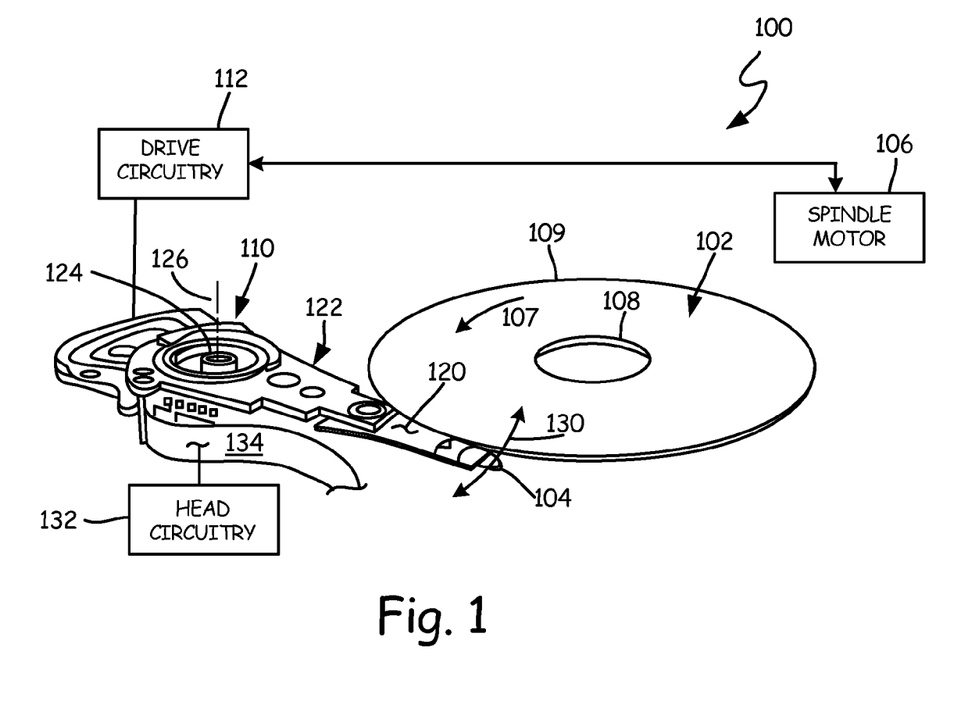
FIG. 1 illustrates an embodiment of a data storage device including a head having one or more transducer elements electrically connected to read/write circuitry.

The present application relates to a multiple layered interconnect structure for interconnecting one or more transducer or electrical elements on a head to circuitry for read and/or write operations. FIG. 1 illustrates an embodiment of a data storage device 100 in which embodiments of the multiple layered structure are used. As shown in FIG. 1, the data storage device 100 includes a magnetic data storage media or disc 102 and a head 104 including one or more transducer elements (not shown in FIG. 1). The head 104 is positioned above the data storage media 102 to read data from and/or write data to the data storage media 102. In the embodiment shown, the data storage media 102 is a rotating disc or other magnetic storage media that includes one or more magnetic storage layers. For read and write operations, a spindle motor 106 (illustrated schematically) rotates the media 102 as illustrated by arrow 107 and an actuator mechanism 110 positions the head 104 (and one or more transducer elements) relative to data tracks on the rotating media 102. The media 102 can be a bit patterned media or other magnetic storage media including the one or more magnetic recording layers.

Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130. The head 104 is coupled to head or read/write circuitry 132 through flex circuit 134 to transmit and receive signals to or from the one or more transducer elements. The flex circuit 134 includes a flexible substrate having one or more conductive traces to connect the one or more transducer elements on the head to circuitry 132.

Figures 2A, 2B:
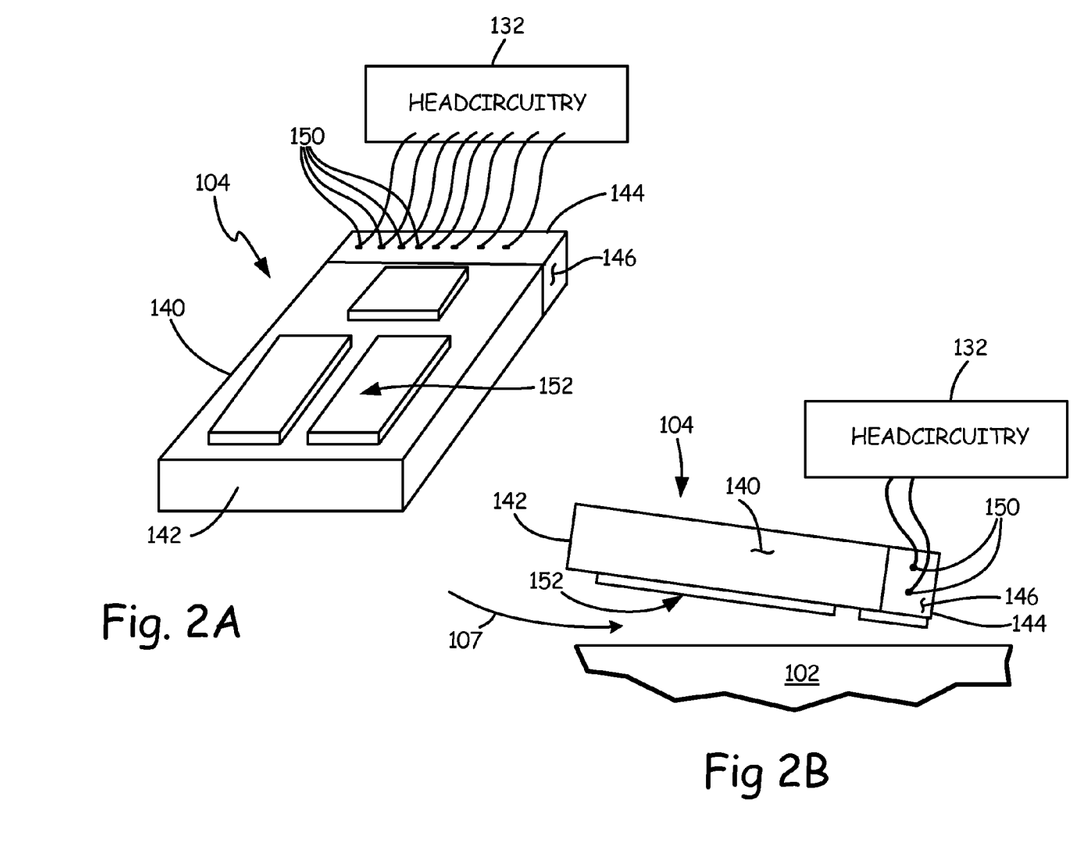
FIGS. 2A-2B illustrate a head of a data storage device including one or more transducer elements along a trailing edge of a slider body connectable to the read/write or head circuitry of the data storage device.

FIGS. 2A-2B illustrate an embodiment of a head 104 including a slider body 140 having a leading edge 142 and a trailing edge 144. In the illustrated embodiment, the one or more transducer elements (not shown) are embedded in a transducer portion 146 of the head along the trailing edge 144 of the slider body 140. The transducer portion 146 typically includes read and write elements. In illustrative embodiments, the transducer portion 146 also includes a heater element and asperity detection element. The one or more transducer elements are connected to the head circuitry 132 through one or more terminals 150 as schematically shown. The slider body 140 includes an air bearing surface 152 along a bottom surface of the head or slider 140 facing the media 102. As shown, the air bearing surface 152 includes one or more raised bearing surfaces and one or more recessed bearing surfaces below the raised bearing surfaces. During operation, rotation of the media or disc 102 creates an air flow in direction 107 as shown in FIG. 1 along the air bearing surface 152 of the slider 140 from the leading edge 142 to the trailing edge 144 of the slider 140. Air flow along the air bearing surface 152 creates a pressure profile to support the head 104 and slider 140 above the media 102 for read and/or write operations as shown in FIG. 2B.

Figure 3A:
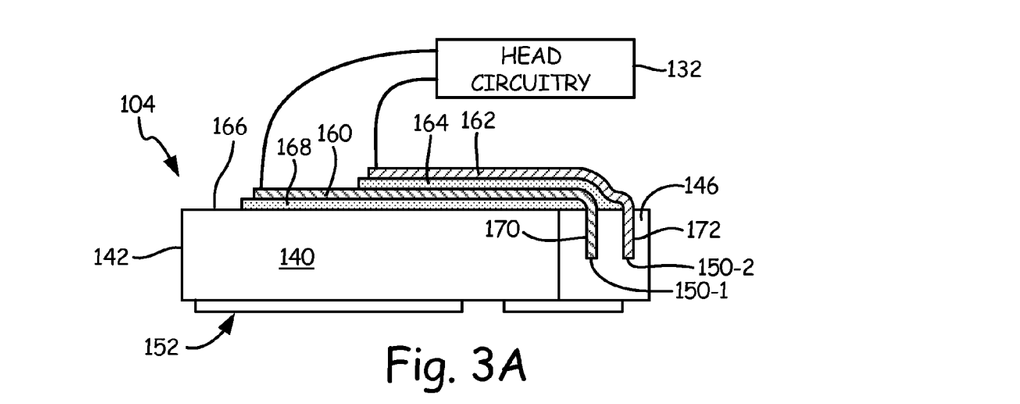
FIGS. 3A-3C illustrate embodiments of a multiple layered interconnect structure.
Figure 3B:
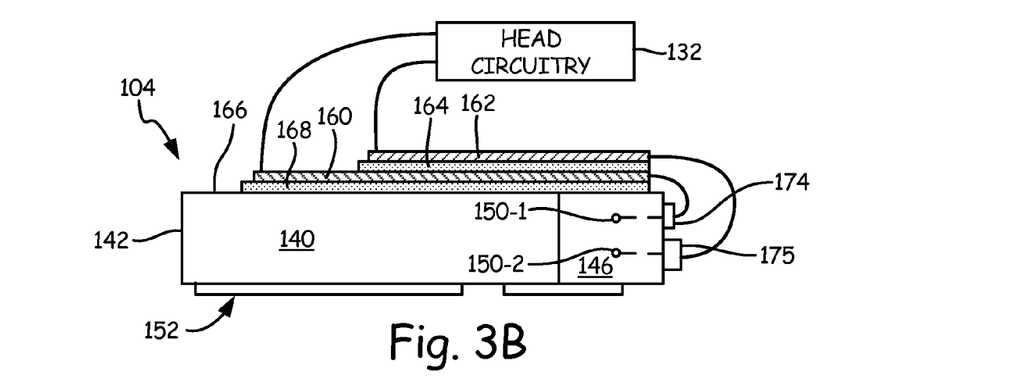

FIGS. 3A-3B illustrate embodiments of the multiple layered interconnect structure to connect the one or more transducer or electrical elements to the head circuitry 132 through flex circuit 134 (not shown in FIGS. 3A-3B) as previously described. As shown, the interconnect structure includes a first or lower trace 160 connectable to a first terminal 150-1 coupled to the one or more transducer elements and a second or upper trace 162 on top of the first or lower trace 160 connectable to a second terminal 150-2 coupled to the one or more transducer elements. In the embodiment shown, a non-conductive insulating layer 164 separates the first or lower trace 160 and the second or upper trace 162. The first and second traces 160, 162 of the multiple layered interconnect structure are formed along a back surface 166 of the slider body opposite to the air bearing surface 152 facing the media 102. Thus, as shown, the first and second traces 160, 162 provide an interconnect for the one or more transducer elements to head circuitry 132 along the back surface 166 of the slider body 140. As shown in FIGS. 3A-3B, a base insulating layer 168 is disposed between the first or lower trace 160 and the slider body 140 to insulate the first or lower trace 160 from the slider body 140.

In the embodiment illustrated in FIG. 3A, the first and second traces 160, 162 are connected to terminals 150-1, 150-2 through vias 170, 172 extending from the back surface 166 of the slider body 140 through an insulating structure of the transducer portion 146 of the head 104. In particular, the first trace 160 is electrically coupled to terminal 150-1 through via 170 and the second trace 162 is electrically coupled to terminal 150-2 through via 172. As shown, via 172 is spaced forward of via 170, although application is not limited to a particular arrangement or structure for electrically connecting traces 160, 162 to the one or more transducer elements.

In the embodiment illustrated in FIG. 3B, the first and second traces 160, 162 are connected to the one or more transducer elements through trailing edge bond pads 174, 175 electrically coupled to terminals 150-1, 150-2 connected to the one or more transducer elements. In the illustrated embodiment, the trailing edge bond pads 174, 175 are spaced between the air bearing surface 152 and back surface 166 along the trailing edge 144 of the slider body 140. Application of the embodiments disclosed herein is not limited to the particular placement of the bond pads 174, 175 shown in FIG. 3B and other arrangements or structures can be used to electrically connect the traces 160, 162 to the one or more transducer elements of the head 104.

Figure 3C:
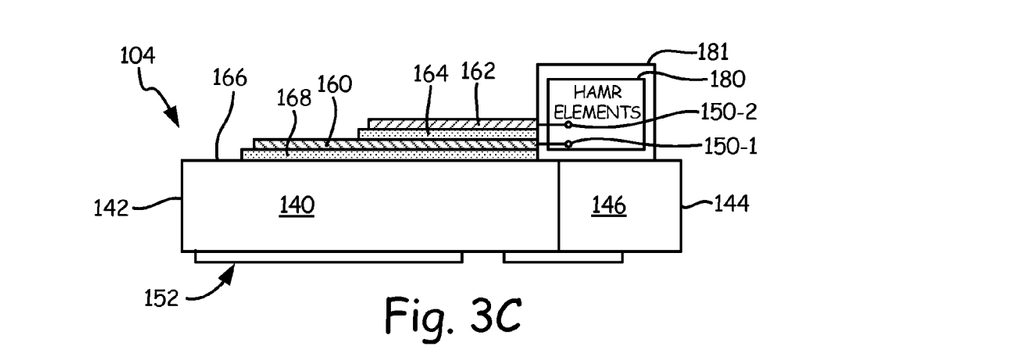

In the embodiment illustrated in FIG. 3C, the multiple layer interconnect structure is used to connect one or more heat assisted magnetic recording (HAMR) elements 180 (schematically shown) to the head circuitry 132 for heat assisted magnetic recording. The one or more HAMR elements 180 include a laser diode and/or heat source to deliver heat to media 102 through a wave guide (not shown) fabricated on the slider 140 to enhance magnetic recording. In the illustrated embodiment, the HAMR elements 180 are assembled in a HAMR unit or structure 181 mounted on the back surface 166 of the slider 140 opposite to the air bearing surface 152. As shown, the first or lower trace 160 and second or upper trace 162 connect to the one or more HAMR elements 180 through terminals 150-1, 150-2 to provide the electrical connection between the one or more HAMR elements 180 and the head circuitry 132. Terminals 150-1, 150-2 can be located along a leading edge of the HAMR unit or structure 181 or along an underside of the HAMR unit or structure 181 between the HAMR unit or structure 181 and the back surface 166 of the slider 140. In an alternate embodiment not shown, the HAMR elements 180 are formed along the trailing edge of the slider 140 and are not incorporated into the HAMR unit or structure 181 shown. Thus, it should be understood that application of the multiple layered interconnect structure is not limited to HAMR elements incorporated into the HAMR unit or structure 181 but can be used to interconnect HAMR elements 180 on the slider body 140.

Figure 4A:
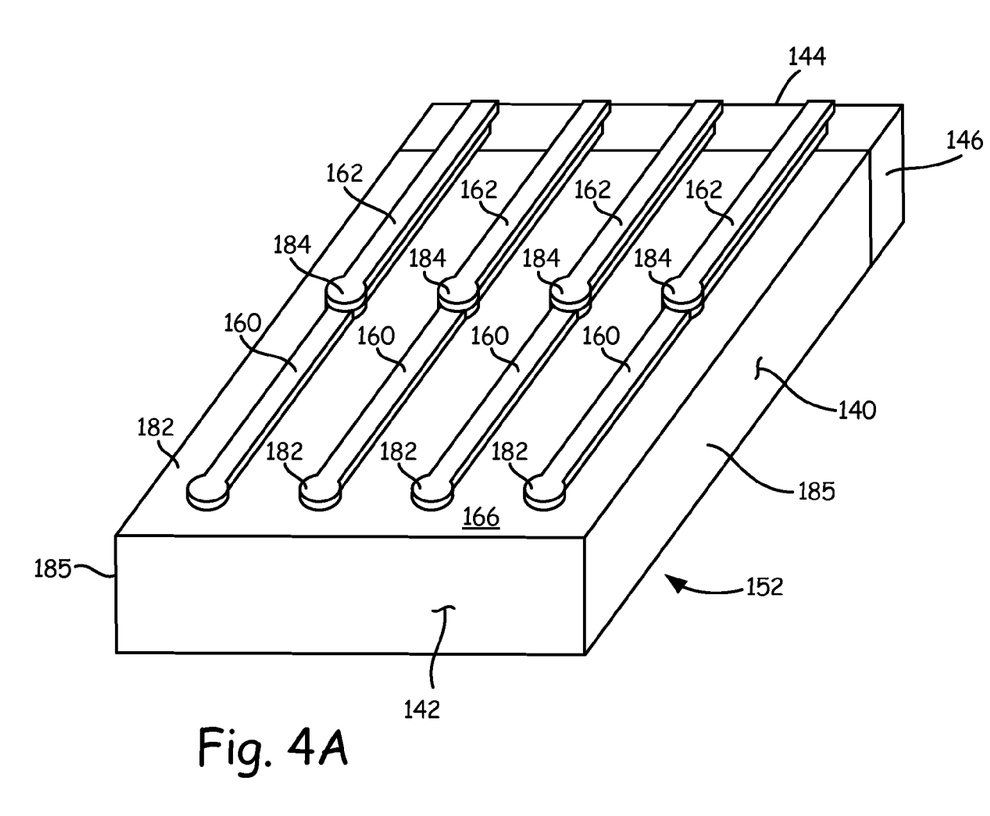
FIGS. 4A-4B illustrate embodiments of an interconnect arrangement on a back side or back surface of a slider body including a plurality of multiple layered interconnect structures to provide an electrical connection for multiple transducer or electrical elements on the head.
Figure 4B:
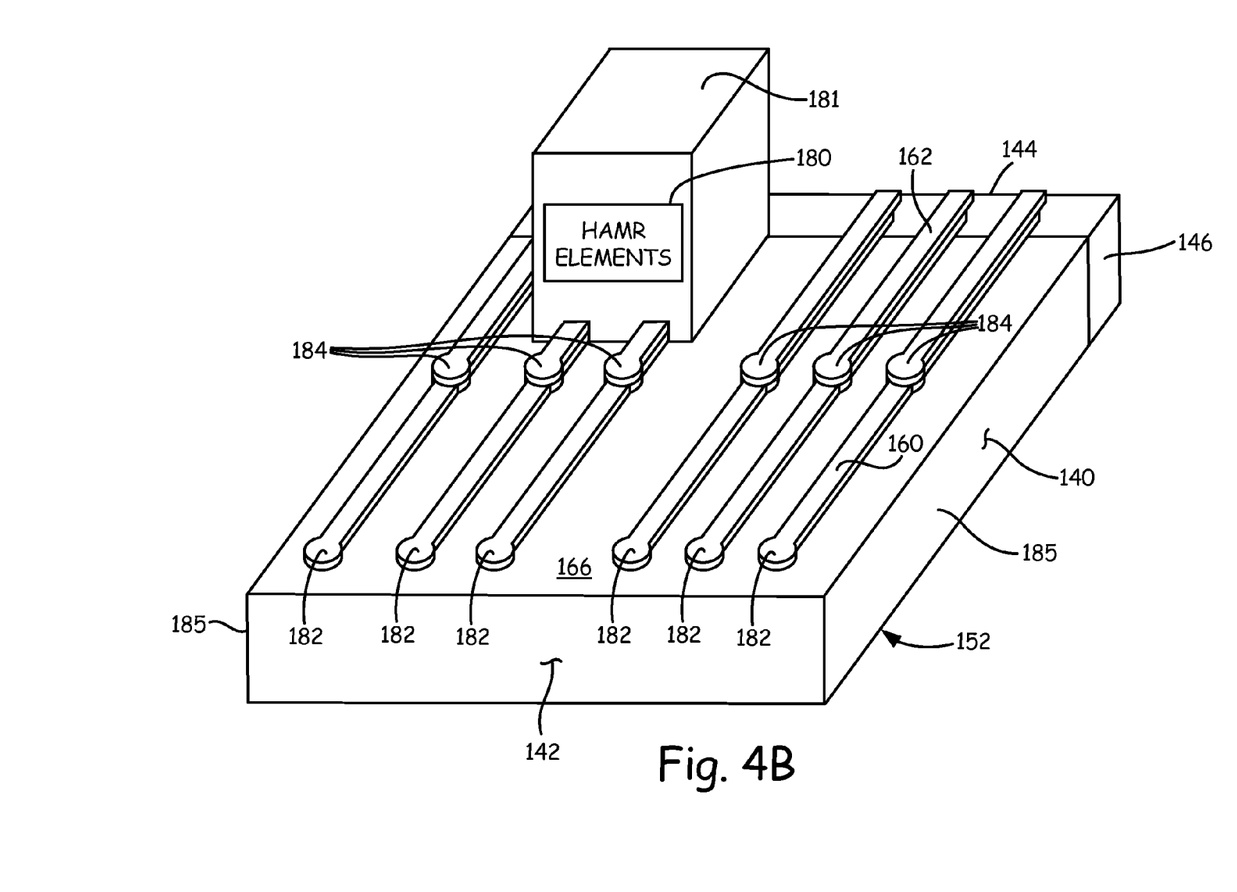

FIGS. 4A-4B illustrate an interconnect embodiment including a plurality of multiple layered interconnect structures on the back side or surface 166 of the slider body to provide the electrical connection to multiple transducer or electrical elements on the slider body 140. Each of the traces 160, 162 of the multiple layered interconnect structures shown in FIGS. 4A-4B is connected to a bond pad to provide the interconnect between traces 160, 162 and the flex circuit 134. As shown, the first or lower trace 160 of each of the interconnect structures is connected to a first or lower bond pad 182 and the second or upper trace 162 of each of the interconnect structures is connected to a second or upper bond pad 184. The first or lower bond pad 182 is located closer to the leading edge 142 rearward from the second or upper bond pad 184. The second or upper bond pad 184 is located closer to the trailing edge 144 of the slider body 140. In the embodiments illustrated shown in FIGS. 4A-4B, the plurality of multiple layered interconnect structures are formed on the back surface 166 of the slider body 140 to form a plurality of top side bond pads 182, 184. As shown, the upper and lower traces 160, 162 extend in a generally straight line path along the back surface 166 from the first and second bond pads 182, 184 toward the trailing edge 144 of the slider body 140.

In alternate embodiments, the path of the multiple layered interconnect structures can bend in different directions or can follow a curved path and embodiments of the interconnect structures do not need to follow the straight line path shown in FIGS. 4A-4B. In the illustrated embodiment, the second or upper bond pad 184 is located closer to the trailing edge 144 of the slider body 140 than the lower or first bond pad 182, however application is not limited to the particular embodiment shown. In particular, in alternate embodiments, the first and second bond pads 182, 184 are spaced in a cross-track direction between opposed sides 185 of the slider body. Thus, it should be understood the first and second bond pads 182, 184 of the multiple layered interconnect structure can be spaced in any direction to accommodate different form factor dimensions and design criteria.

In the embodiment shown in FIG. 4A, the plurality of multiple layered structures provide an electrical interconnect for multiple transducer elements embedded within the transducer portion 146 of the head. In particular as shown in FIG. 4A, four multiple layered interconnect structures are fabricated on the back surface 166 of the slider 140 to provide the electrical interconnect to a writer element, reader element, thermal asperity detection element and heater element (not shown) and the head circuitry 132. In FIG. 4B, the plurality of multiple layered structures provide interconnects for multiple transducer elements on the transducer portion 146 of the head 104 and HAMR elements 180 which as shown in FIG. 4B are incorporated into HAMR unit or structure 181 mounted on the back surface 166 of the slider 140. In particular, as shown in FIG. 4B, four interconnect structures are formed on the slider 140 to provide eight electrical interconnects to the read, write, asperity detection and heater elements of the transducer portion 146 to circuitry 132. The slider 140 also includes two interconnect structures to provide four interconnects to between the HAMR elements 180 of the HAMR unit 181 to the head circuitry 132.

The HAMR elements 180 can be connected to traces 160, 162 of the interconnect structures through direct connection or through interconnect structure on the HAMR unit or structure 181, such as through wire and/or solder connections or through via connections (not shown). In the illustrated embodiments shown in FIGS. 4A-4B, the bond pads 182, 184 are generally circular shaped but application is not limited to a particular shaped bond pad. In an illustrative embodiment, one of the upper or lower traces 160, 162 of one or more of the interconnect structures shown in FIG. 4B is connected to a transducer element on the transducer portion 146 of the head and the other of the upper and lower traces 160, 162 is connected to a HAMR element 180. Thus application of the multiple layered interconnect structure is not limited to interconnect structures having both the upper and lower traces 160, 162 connected to either the transducer elements or the HAMR elements 180 on the head 104 and one or more multiple layered interconnect structures can provide an electrical connection to both a transducer element and HAMR element 180 on the head 104.

Figure 5:
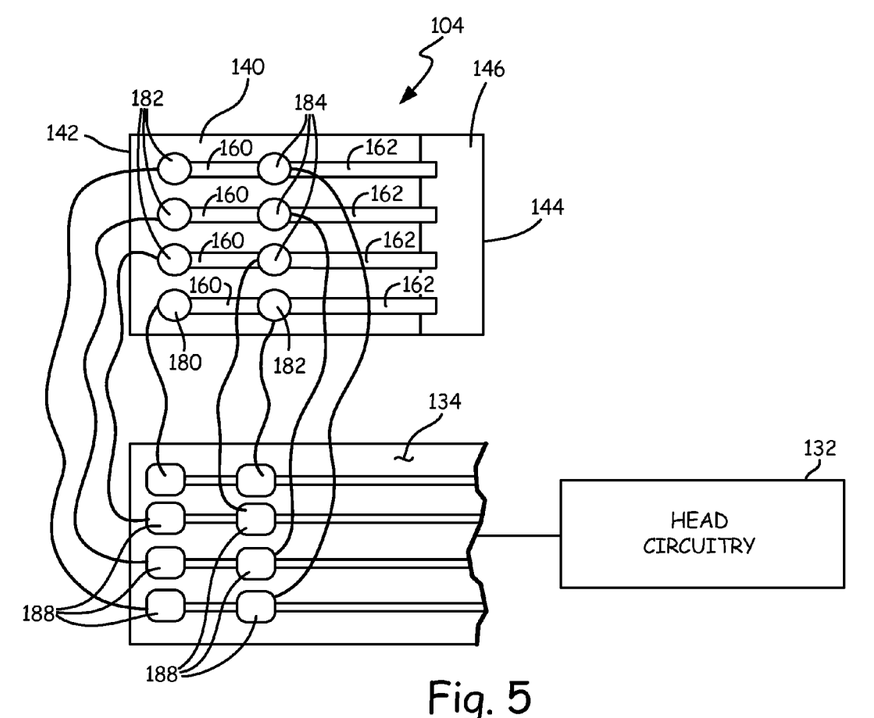
FIG. 5 is a schematic illustration of an interconnection between bond pads of the interconnect structure of FIGS. 3A-3B and FIGS. 4A-4B to bond pads on a flex circuit.

As schematically illustrated in FIG. 5, the first or lower bond pads 182 and upper or second bond pads 184 are connected to bond pads 188 on the flex circuit 134 to provide the electrical connection between the one or more transducer or electrical elements and flex circuit 134 coupled to the read/write or head circuitry 132. The first or lower bond pads 182 and upper or second bond pads 184 are connected to the bond pads 188 on the flex circuit 134 through solder connections or other connections as is known in the art.

Figure 6A:
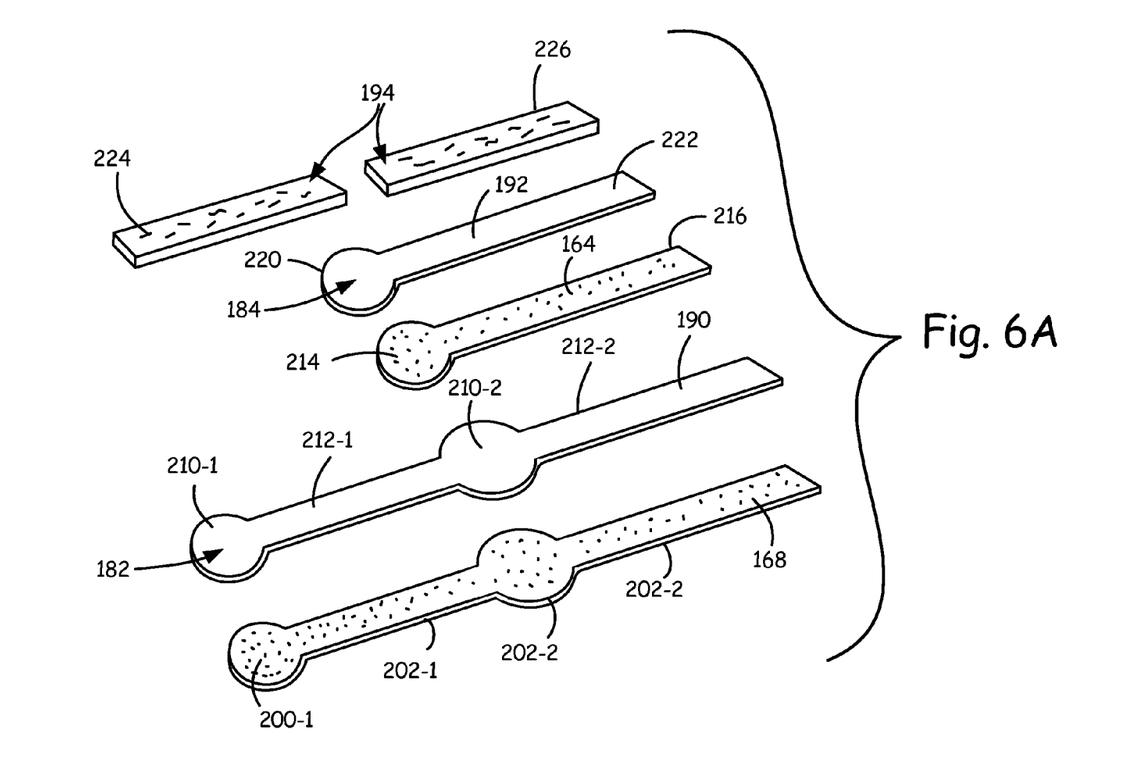
FIGS. 6A-B illustrate different embodiments of the multiple layered interconnect structures including first and second interconnecting layers.
Figure 6B:
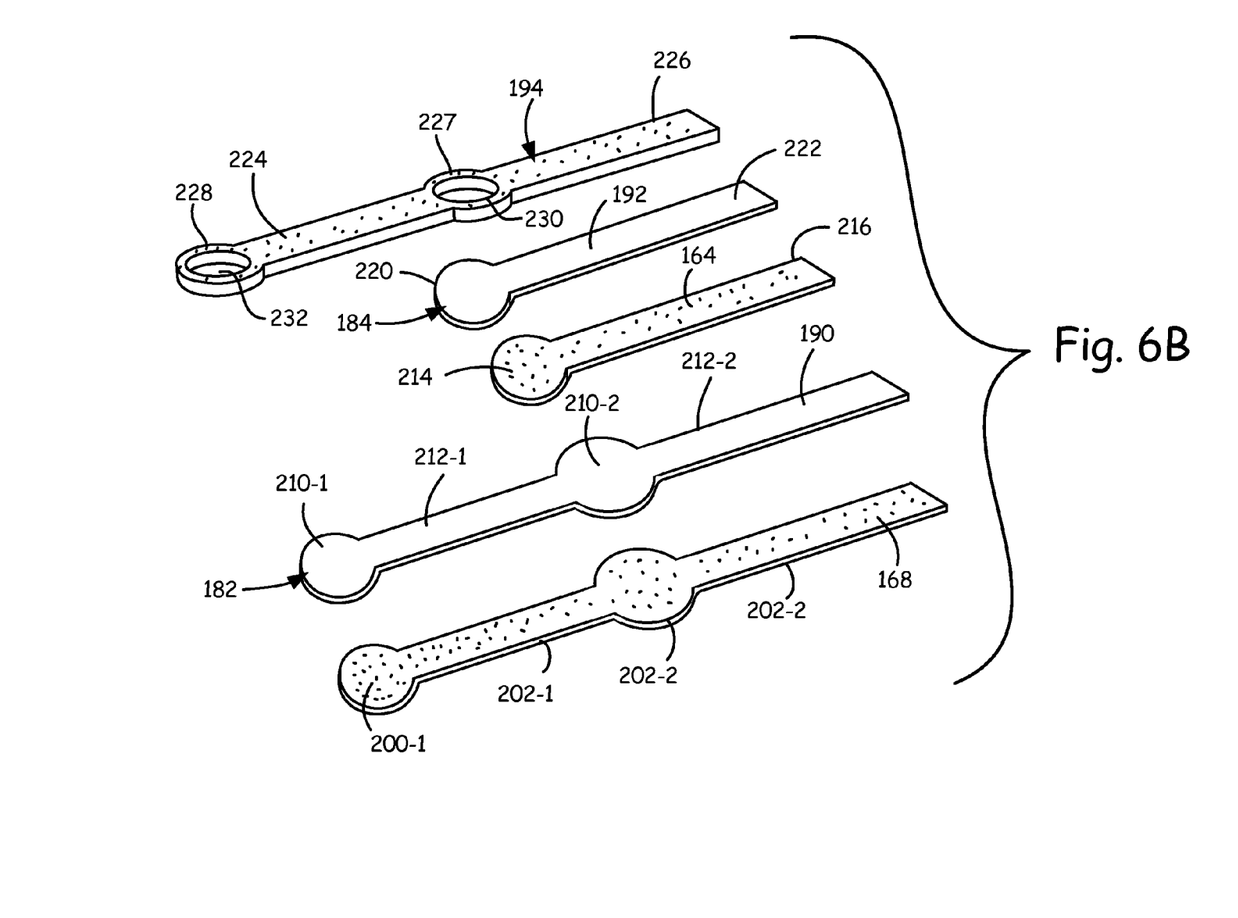
Figure 6C:
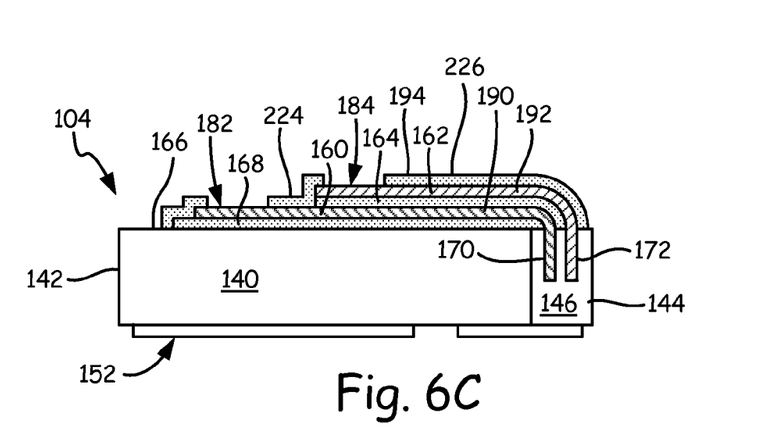
FIG. 6C is a cross-sectional view of the multiple layered interconnect structure shown in FIG. 6B connected to one or more transducer elements through vias.

FIGS. 6A-6C illustrate the multiple layers of an embodiment of the multiple layered interconnect structure forming the first and second bond pads 182, 184 and traces 160, 162 as previously described. As shown in FIG. 6A, the interconnect structure includes the base insulating layer 168, a first interconnecting layer 190, insulating layer 164, a second interconnecting layer 192 and a cover layer 194. The base insulating layer 168 as shown includes spaced insulating pads 200-1, 200-2 and insulating strips 202-1, 202-2. The insulating pads 200-1, 200-2 have an enlarged area dimension coinciding with area dimensions of the bond pads 182, 184. As shown, insulating strip 202-1 extends between the spaced insulating pads 200-1, 200-2 and the insulating pad 200-2 is between insulating strips 202-1, 202-2. As shown, the first interconnecting layer 190 includes conductive pads 210-1, 210-2 and conductive strips 212-1, 212-2. The insulating layer 164 includes insulating pad 214 and elongate insulating strip 216.

The second interconnecting layer 192 includes conductive pad 220 and conductive strip 222 and the cover layer 194 includes cover layer portions 224, 226 to provide a protective layer for conductive strip 212-1 of the first interconnecting layer 190 and the conductive strip 222 of the second interconnecting layer 192.

In the embodiment shown in FIG. 6B, the cover layer 194 of the interconnecting structure is formed of an elongate layer which has a length that extends along the first and second interconnecting layers 190, 192. The cover layer 194 as shown includes cover strip portions 224, 226 and enlarged portions 227, 228 surrounding bond pad openings 230, 232, respectively. As shown, the strip portion 226 of the cover layer 194 overlays the second interconnecting layer 192 and the enlarged portion 227 and opening 230 overlay the conductive pad 220 to form the second bond pad 184. Strip portion 224 of cover layer 194 extends along strip 212-1 of the first interconnecting layer 190 and the enlarged portion 228 and opening 232 overlay conductive pad 210-1 to form the first bond pad 182.

As shown in FIGS. 6A-6C, the conductive pads 210-1, 210-2 of the first interconnecting layer 190 are disposed on top of the insulating pads 200-1, 200-2 of insulating layer 168 and the conductive strips 212-1, 212-2 of the first interconnecting layer 190 extend along the elongate insulating strips 202-1, 202-2 of the insulating layer 168 to provide a first interconnect to the one or more transducer or electrical elements. The second conductive pad 220 and strip 222 of the second interconnecting layer 192 are disposed on the second or upper insulating pad 214 and strip 216 of the insulating layer 164 to form a second interconnect. As shown, the insulating pad 214 and strip 216 of insulating layer 164 are disposed on conductive pad 210-2 and strip 212-2 of the first interconnecting layer 190 which is formed on pad 200-2 and strip 202-2 of the base insulating layer 168.

Thus, as shown, conductive pad 210-1 of the first interconnecting layer 190 forms the first bond pad 182 and the conductive strips 212-1, 212-2 and pad 210-2 form the conductive trace 160 or conductive path connecting the first bond pad 182 to the one or more transducer or electrical elements. The conductive pad 220 of the second interconnecting layer 192 forms the second bond pad 184 and the conductive strip 192 forms the conductive trace 162 connecting the second bond pad 184 to the one or more transducer or electrical elements as described. As shown, in FIGS. 6B-6C, protective layer 194 covers the conductive strip 212-1 and a portion of conductive pad 220 of the first interconnecting layer 190 and conductive strip 222 and portion of conductive pad 210-1 of the second interconnecting layer 192 to protect the interconnect structure from damage or corrosion and define a solder wettable area.

Figure 7:
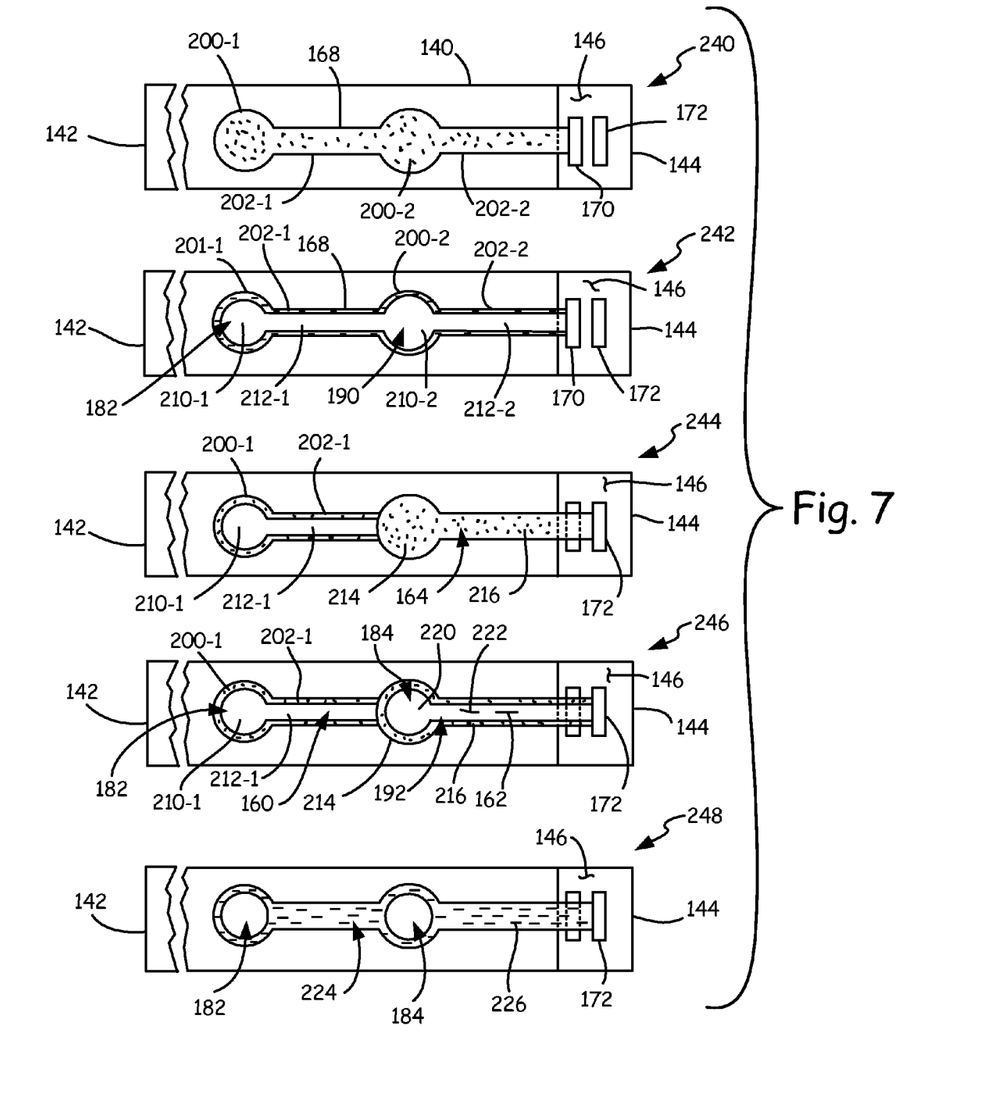
FIG. 7 illustrates process steps for fabricating embodiments of the multiple layered interconnect structure to provide an electrical interconnect for one or more transducer or electrical elements to the read/write or head circuitry.

FIG. 7 illustrates process steps for fabrication of an embodiment of the multiple layered interconnect structure disclosed. As shown in step 240, the base insulating layer 168 is deposited on a substrate body or slider body 140. As previously described, the insulating layer 168 includes insulating pads 200-1, 200-2 and strips 202-1, 202-2 and is deposited along the back surface 166 of the slider body. In the illustrated embodiment, the layer 168 has a length that extends from insulating pad 200-1 proximate to the leading edge 142 to strip 202-2 proximate to the trailing edge 144 of the slider body 140. As shown, strip 202-1 is formed between pads 200-1, 200-2 and pad 200-2 is disposed between strips 202-1, 202-2. As shown in step 242, the first interconnecting layer 190 is deposited on the insulating layer 168. The first interconnecting layer 190 is deposited so that the first conductive pad 210-1 is on insulating pad 200-1 and the second conductive pad 210-2 is on insulating pad 200-2 and conductive strips 212-1, 212-2 extend along insulating strips 202-1, 202-2. The conductive strips 212-1, 212-2 and pad 210-2 form the conductive trace 160 extending from the first bond pad 182 to via 170 or the one or more transducer elements connecting the first bond pad 182 to the via 170 or the one or more transducer elements.

As illustrated in step 244, a second insulating layer 164 is deposited on the conductive pad 210-2 and strip 212-2 of the first interconnecting layer 190. In particular, as shown, the insulating pad 214 of layer 164 is deposited on conductive pad 210-2 and the insulating strip 216 is deposited on conductive strip 212-2. In step 246, the second interconnecting layer 192 is deposited on the second insulating layer 164. In particular as shown, the conductive pad 220 of the second interconnecting layer 192 is deposited on the insulating pad 214 and the conductive strip 222 of the second interconnecting layer 192 is deposited on insulating strip 216 to interconnect with via 172 or the one or more transducer elements on the slider 140. The first and second interconnecting layers 190, 192 are formed of a conductive material such as copper. In step 248, cover layer 194 is deposited on the second interconnecting layer 192 and the conductive strip 212-1 of the first interconnecting layer 190 to provide the protective layer for traces 160, 162.

As described, conductive pad 220 forms the second bond pad 184 and the conductive strip 222 forms the second trace 162 electrically connecting the one or more transducer elements to the flex circuit 134 or head circuitry 132. As described, the second bond 184 is isolated from conductive pad 210-2 of the first interconnecting layer 190 via the insulating pad 214 disposed between the second bond pad 184 and the conductive pad 210-2 of the first interconnecting layer 190. Similarly trace 162 is electrically isolated from trace 160 through insulating strip 216 of the second insulating layer 164 as described. Each of the insulating and interconnecting layers 164, 168, 190, 192 can be fabricated using lithography thin film deposition techniques to form the conductive pads and strips. A photo-sensitive low K resin can be used to fabricate the insulating layers 164, 168 to eliminate deposition of an insulating layer. The interconnecting layer 190, 192 is formed of a conductive trace material such as copper.

It should be understood that the steps shown in FIG. 7 can also be used to provide an interconnect to one or more HAMR elements 180 or other electrical elements illustrated in FIGS. 3C and 4B. In an alternate embodiment, other shaped insulating layers can be deposited on the back side or surface 166 of the slider body to provide an insulating structure between the slider body and the interconnecting layers 190, 192. For example in an illustrated embodiment, the insulating layer can be deposited along the entire back surface 166 of the slider body 140 to insulate each of the insulating structures shown in FIGS. 4A-4B from the slider body 140. In each of the illustrated embodiments described, the multiple layered structure includes two interconnecting layers 190, 192, however application is not limited to two layers and in alternate embodiments any number of interconnecting layers can be fabricated on top of another to form the interconnect structure including multiple spaced bond pads and traces.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application, while maintaining substantially the same functionality without departing from the scope and spirit of the present invention. In addition, although the embodiments described herein illustrate application of the multiple layered interconnect structure on the back surface of the slider body, it will be appreciated by those skilled in the art that application of the multiple layered structure is not limited to the particular applications on the back side of the slider body shown, and that embodiments of the multiple layered structure can be modified without departing from the scope and spirit of the present invention.

What is claimed is:

1. A head comprising:
    a slider body;
    a first bond pad over the slider body coupled to a first conductive trace over the slider body;
    a second bond pad over the slider body spaced from the first bond pad and coupled to a second conductive trace above the first conductive trace; and
    an insulating layer between the first and second conductive traces insulating the second trace from the first trace, wherein the first bond pad and the first conductive trace are a part of an interconnect layer comprising a plurality of conductive pads connected by conductive strips, with one of the plurality of conductive pads forming the first bond pad, and wherein the plurality of conductive pads and the conductive strips are in substantially a same plane.

2. The head of claim 1 including a base insulating layer between the first conductive trace and the slider body.

3. The head of claim 1 wherein the slider body includes an air bearing surface including one or more raised bearing surfaces and a recessed bearing surface and a back surface facing in a direction opposite to the air bearing surface and the first and second bond pads and the first and second conductive traces are formed the back surface of the slider body.

4. The head of claim 1 wherein the head includes one or more transducer elements embedded in a transducer portion along a trailing edge of the slider body and the first and second conductive traces are connected to the one or more transducer elements through vias extending from the first and second conductive traces to the one or more embedded transducer elements.

5. The head of claim 4 wherein the first and second bond pads and the first and second conductive traces are formed over a back surface of the slider body opposite to an air bearing surface of the slider body and the vias extend from the back surface of the slider body to the one or more embedded transducer elements.

6. The head of claim 1 wherein the head includes one or more heat assisted magnetic recording elements on the slider body and the first and second traces are coupled to one or more HAMR elements for heat assisted magnetic recording.

7. The head of claim 1 comprising a protective layer above the second conductive trace and a portion of the first conductive trace.

8. The head of claim 1 wherein the first and second bond pads are over a back surface of the slider body between a leading edge and a trailing edge of the slider body and the first bond pad is located closer to the leading edge of the slider body and the second bond pad is located closer to the trailing edge of the slider body.

9. A head comprising:
    a slider body;
    an interconnect structure over the slider body including a first interconnecting layer including a first or lower bond pad connectable to one or more electrical elements through the first interconnecting layer and a second interconnecting layer above the first interconnecting layer including a second or upper bond pad connectable to the one or more electrical elements through the second interconnecting layer; and an insulating layer between the first interconnecting layer and the second interconnecting layer, wherein the interconnect structure is over a back surface of the slider body opposite to an air bearing surface of the slider body and the first and second bond pads are coupled to the one or more electrical elements through first and second traces of the first and second interconnecting layers, and wherein the first interconnecting layer includes a first conductive pad forming the first bond pad and a second conductive pad spaced from the first conductive pad and first and second conductive strips forming the first trace and the second interconnecting layer includes a third conductive pad above the second conductive pad of the first interconnecting layer forming the second bond pad and a third conductive strip over the second conductive strip forming the second trace.

10. The head of claim 9 and comprising a base insulating layer on the back surface of the slider body between the first interconnecting layer and the slider body.

11. The head of claim 9 wherein the one or more electrical elements include one or more transducer elements embedded in a transducer portion along a trailing edge of the slider body and the first and second bond pads are coupled to the one or more transducer elements through vias extending through the transducer portion.

12. The head of claim 9 wherein the one or more electrical elements include one or more heat assisted magnetic recording elements on the slider body and the one or more HAMR elements are coupled to the first and second bond pads through the first and second interconnecting layers.

13. The head of claim 9 wherein the back surface of the slider includes a plurality of first and second interconnecting layers including a plurality of first and second bond pads to electrically connect a plurality electrical elements to head circuitry.

14. The head of claim 9 wherein the insulating layer includes an insulating pad between the second and third conductive pads and an insulating strip between the second and third conductive strips.

15. A method comprising:

depositing first and second conductive pads and first and second conductive strips over a substrate body to form a first interconnecting layer and a first bond pad, wherein the first and second conductive pads are connected by the first conductive strip, and wherein the first and second conductive pads and the first and second conductive strips are in substantially a same plane;

depositing an insulating pad on the second conductive pad and an insulating strip on the second conductive strip; and depositing a third conductive pad on the insulating pad and third conductive strip on the insulating strip to form a second interconnecting layer and a second bond pad.

16. The method of claim 15 and comprising:

depositing a plurality of transducer layers on the substrate body to form one or more transducer elements and vias encapsulated in a transducer portion along a trailing edge of the substrate body;

exposing vias from a back surface of the substrate body through the transducer portion;

depositing the first and second interconnecting layers over the back surface of the substrate body; and connecting the one or more transducer elements to the first and second bond pads through the first and second interconnecting layer and the vias.

17. The method of claim 15 and comprising:

depositing a base insulating layer on the substrate body prior to depositing the first and second interconnecting layers and depositing the first interconnecting layer on the base insulating layer.

* * * * *